(12) United States Patent
Marru et al.

(10) Patent No.: US 11,971,594 B2
(45) Date of Patent: Apr. 30, 2024

(54) FLEXIBLE OPTICAL FIBER CABLE

(71) Applicant: Sterlite Technologies Limited, Gurugram (IN)

(72) Inventors: Pramod Marru, Gurugram (IN); Sravan Kumar, Gurugram (IN)

( * ) Notice: Subject to any disclaimer, the term of this patent is extended or adjusted under 35 U.S.C. 154(b) by 0 days.

(21) Appl. No.: 17/700,470

(22) Filed: Mar. 21, 2022

(65) Prior Publication Data
US 2023/0204894 A1    Jun. 29, 2023

(30) Foreign Application Priority Data

Dec. 28, 2021 (IN) .............................. 202111061174

(51) Int. Cl.
*G02B 6/44* (2006.01)
*G02B 6/255* (2006.01)

(52) U.S. Cl.
CPC ............ *G02B 6/443* (2013.01); *G02B 6/2557* (2013.01); *G02B 6/4478* (2013.01)

(58) Field of Classification Search
None
See application file for complete search history.

(56) References Cited

U.S. PATENT DOCUMENTS

| 5,201,020 A * | 4/1993 | Kannabiran | G02B 6/443 385/113 |
| 2003/0138226 A1* | 7/2003 | Rossi | G02B 6/4429 385/109 |
| 2020/0341221 A1* | 10/2020 | Sirin | G02B 6/4432 |

OTHER PUBLICATIONS

"Propylene-Butene Copolymers: Tailoring Mechanical Properties from Isotactic Polypropylene to Polybutene"; De Rosa et al.; May 18, 2020 ; Macromolecules 2020, 53, 11, 4407-4421.*

* cited by examiner

*Primary Examiner* — Jerry Rahll
(74) *Attorney, Agent, or Firm* — Steven R. Fairchild; Arun Narasani

(57) ABSTRACT

The present disclosure provides an optical fiber cable (100). The optical fiber cable (100) includes one or more optical fiber (102), one or more loose tube (104) surrounding the one or more optical fiber (102) and an outer sheath (108) surrounding the one or more loose tube (104). The material composition of the one or more loose tube (104) is a mixture of a first material and a second material. The flexural modulus of the first material is at least 1000 MPa. The flexural modulus of the second material is at most 50 MPa. The material composition of the outer sheath (108) is a mixture of a first material and a second material. The flexural modulus of the first material is at least 500 MPa. The flexural modulus of the second material is at most 50 MPa.

16 Claims, 3 Drawing Sheets

100

FLEXIBLE OPTICAL FIBER CABLE

TECHNICAL FIELD

The present invention relates to the technical field of optical fibers, more particularly to a flexible optical fiber cable.

BACKGROUND

Over the last few years, there has been a rapid rise in the development and usage of networking technology. This is particularly in the field of optical fiber cables and their applications. Optical fibers are delicate when exposed which risks their breakage while handling and kink defects while rolling on a spindle for storage or transport purposes. Optical fiber cables and tubes inside the cables undergo various bending movements during handling and installation. Therefore, optic fibers are encapsulated inside loose tubes. In general, loose tubes are also known as buffer tubes and are used to encapsulate one or more optical fibers to cater to various needs like mechanical isolation, prevention from damage and the like. Conventionally, the loose tubes are made up of polymers like polypropylene, polycarbonate, PBT and the like. These loose tubes are stiff, difficult to handle and coil during installation. The optical fiber cables are also protected by using a polyethylene outer sheath. The outer sheath is extruded over the loose tubes providing strength and crush resistance to the cable. The sheath and the tube materials make the cable stiffer and as the cable diameter increases, more challenging to handle.

U.S. Pat. No. 8,145,026B2 discloses deployment of optical fibers in improved drop-cable structures. It discloses buffer tubes made of polyolefin blends such as polyethylene and polypropylene. It further mentions use of additives such as nucleating agents, flame-retardants, smoke-retardants, antioxidants, UV absorbers, and/or plasticizers US2010084158A1 discloses polymer compositions composed of a polyethylene resin (e.g., LLDPE), carbon black and an olefin block interpolymer are provided, which are useful for, among other things, the production of wire and cable jacketing that possess an increased high temperature rating, flexibility and comparable ease of removal of the jacket from the cable core.

WO2021122299A1 discloses a mixed-plastic-polyethylene composition suitable for wire and cable applications, such as jacketing applications. In a first aspect the above stated invention relates to a mixed-plastic-polyethylene composition comprising a total amount of ethylene units (C2 units) of from 90.00 to 99.00 wt %, and a total amount of continuous units having 3 carbon atoms corresponding to polypropylene (continuous C3 units) of from 0.10 to 5.00 wt %, with the total amounts of C2 units and continuous C3 units being based on the total weight amount of monomer units in the composition and measured according to quantitative 13C{1H} NMR measurement, and wherein the composition has a melt flow rate (ISO 1133, 2.16 kg, 190° C.) of from 0.1 to 2.0 g/10 min; a density of from 930 kg/m3 to 955 kg/m3, preferably from 932 to 953 kg/m.

In the light of the above stated discussion, there is a need of a better, more flexible material for the loose tubes and outer sheath of the optical fiber cables to overcome the disadvantages stated above.

Object of the Disclosure

A primary object of the present disclosure is to provide a flexible loose tube for an optical fiber cable in all application fields.

Another object of the present disclosure is to provide a flexible outer sheath for the optical fiber cable in all application fields.

Yet another object of the present disclosure is to provide a variable flexibility composition for manufacturing flexible loose tubes and outer sheath depending on the type of usage or application of the optical fiber cable.

SUMMARY

In an aspect, the present disclosure provides a flexible optical fiber cable. The optical fiber cable includes one or more optical fiber, one or more loose tube surrounding the one or more optical fiber and an outer sheath surrounding the one or more loose tube. The material composition of the one or more loose tube is a mixture of a first material and a second material. The flexural modulus of the first material is at least 1000 MPa. The flexural modulus of the second material is at most 50 MPa. In accordance with an aspect of the present disclosure, the loose tube has all the desired specifications and increased flexibility in order to reduce the kink diameter and increase the ease of handling. In another aspect, the present disclosure provides an optical fiber cable. The optical fiber cable includes one or more optical fiber extending longitudinally along a length of the optical fiber cable and an outer sheath surrounding the one or more optical fiber. A material composition of the outer sheath is a mixture of a first material and a second material. Flexural modulus of the first material is at least 500 MPa and flexural modulus of the second material is at most 50 MPa.

Statement of Disclosure

The present disclosure provides one or more optical fiber cable. The one or more optical fiber cable includes one or more optical fiber, one or more loose tube surrounding the one or more optical fiber and an outer sheath surrounding the one or more loose tube. The material composition of the one or more loose tube is a mixture of a first material and a second material. Flexural modulus of the first material is at least 1000 MPa and the flexural modulus of the second material is at most 50 MPa. The material composition of the outer sheath is a mixture of a first material and a second material. Flexural modulus of the first material is at least 500 MPa and flexural modulus of the second material is at most 50 MPa.

BRIEF DESCRIPTION OF THE FIGURES

Figure 1:
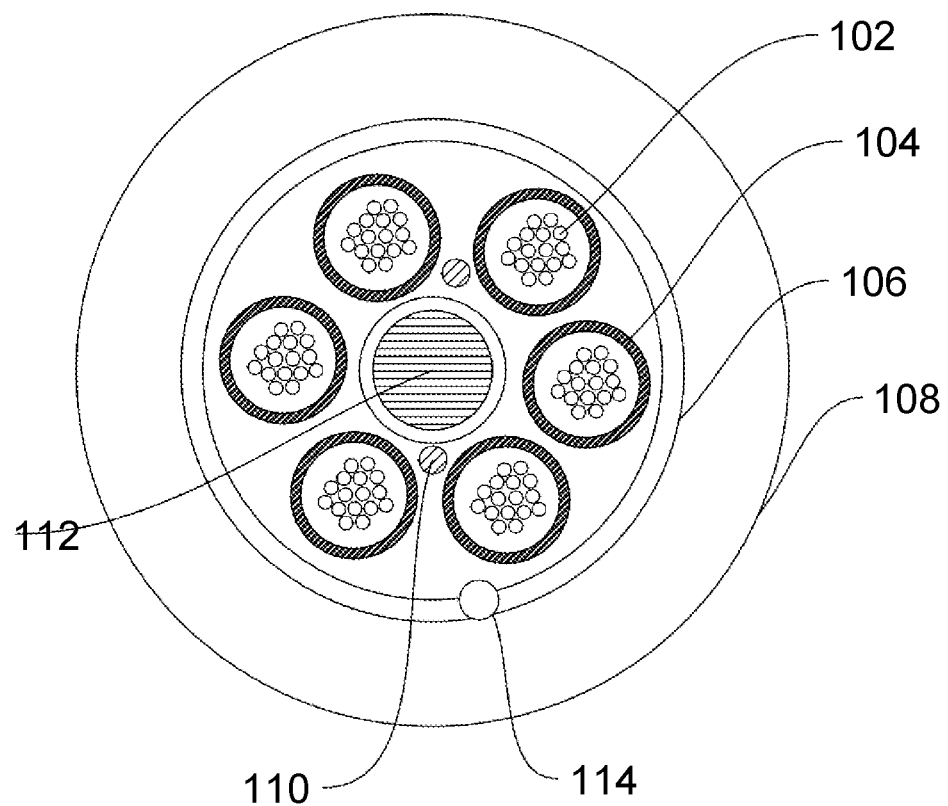
Figure 2:
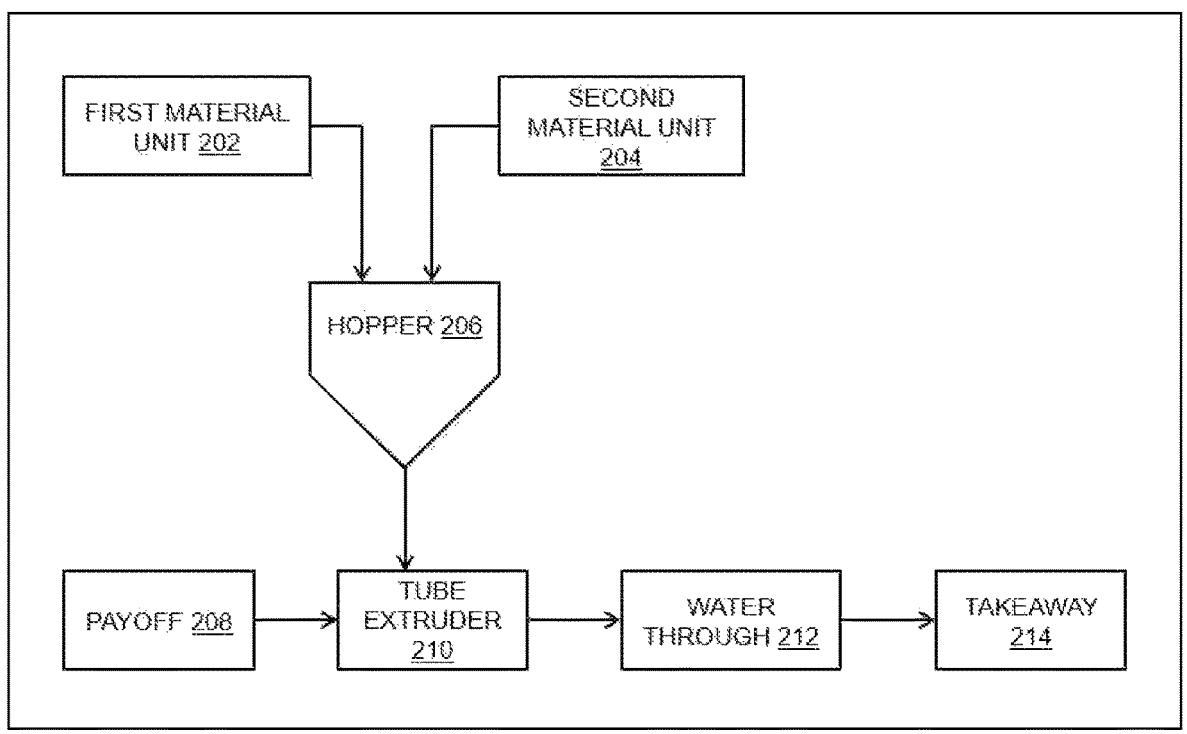

Having thus described the invention in general terms, reference will now be made to the accompanying drawings, which are not necessarily drawn to scale, and wherein:

FIG. 1 illustrates a cross section view of an exemplary optical fiber cable, in accordance with various aspects of the present disclosure; and FIG. 2 illustrates a block diagram of a system for manufacturing the flexible loose tube of an optical fibre cable of FIG. 1, in accordance with various aspects of the present disclosure.

Figure 3:
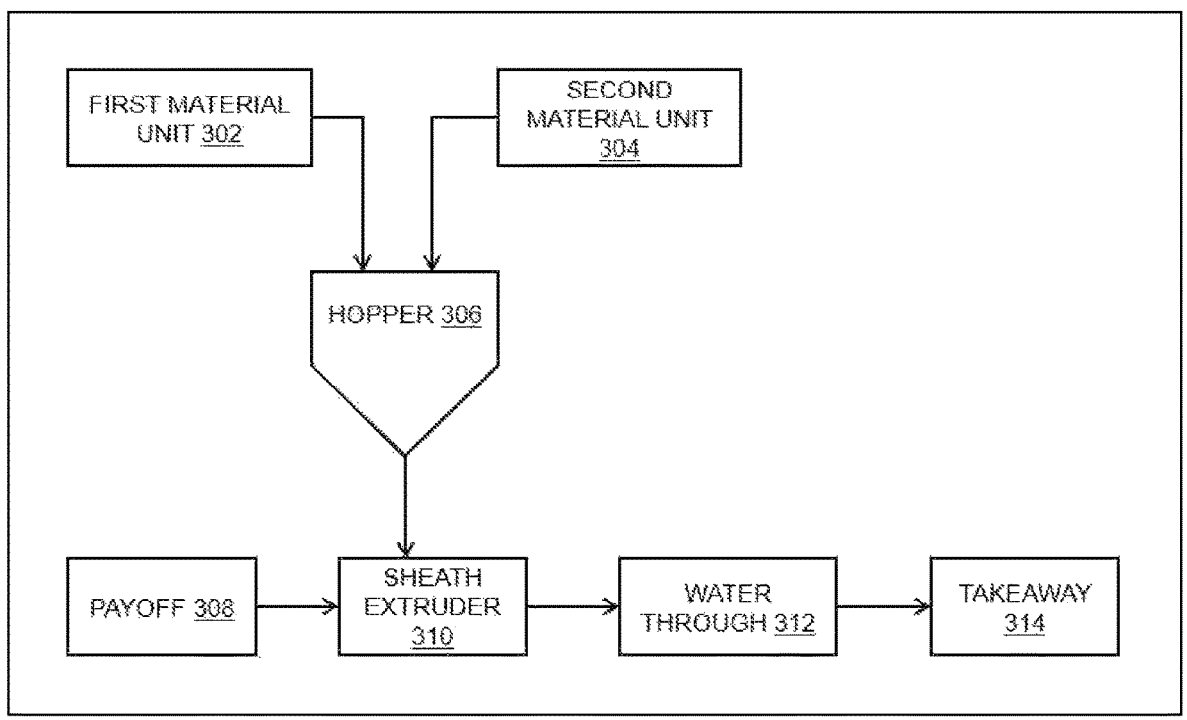

FIG. 3 illustrates a block diagram of a system for manufacturing the flexible sheath of an optical fibre cable of FIG. 1, in accordance with various aspects of the present disclosure.

It should be noted that the accompanying figures are intended to present illustrations of exemplary aspects of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one aspect" or "an aspect" means that a particular feature, structure, or characteristic described in connection with the aspect is included in at least one aspect of the present technology. The appearance of the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology. Although the following description provides an optical fiber cable, the shown cable construction method can be applied to any cable with loose tube and sheath.

FIG. 1 illustrates a cross sectional view of an exemplary optical fiber cable 100, in accordance with various aspects of the present disclosure. The optical fiber cable 100 is a flexible optical fiber cable. The optical fiber cable 100 includes one or more optical fiber 102, one or more loose tube 104 and a first layer 106. In addition, the optical fiber cable 100 includes an outer sheath 108, a plurality of water swellable yarns 110, a central strength member 112 and ripcord 114. The optical fiber cable 100 is a cable used for carrying light over long distances. Furthermore, the optical fiber cable 100 may simply be used to transmit optical signals (which may carry sensor data or communication data).

The optical fiber cable 100 includes the one or more optical fiber 102. The one or more optical fiber 102 extends longitudinally along a length of the optical fiber cable 100. The one or more optical fiber 102 is a fiber used for transmitting information as light pulses from one end to another. In addition, each of the one or more optical fiber 102 is a thin strand of glass or plastic capable of transmitting optical signals. Also, the one or more optical fiber 102 is configured to transmit large amounts of information over long distances with relatively low attenuation. Further, each of the one or more optical fiber 102 includes a core region and a cladding region. The core region is an inner part of an optical fiber and the cladding section is an outer part of the optical fiber. Moreover, the core region is defined by a central longitudinal axis of each of the one or more optical fiber 102. In addition, the cladding region surrounds the core region.

The core region and the cladding region are formed along the central longitudinal axis of each of the one or more optical fiber 102. Moreover, the core region and the cladding region are formed during the manufacturing stage of each of the one or more optical fiber 102. The core region has a refractive index which is greater than a refractive index of the cladding region. In an aspect, the core region has a higher refractive index than the cladding region.

Each of the one or more optical fiber 102 has a diameter of about 160 micron or 250 micron. In another aspect, the diameter of each of the one or more optical fiber 102 may vary. In an aspect, each of the one or more optical fiber 102 is a single mode fiber. In another aspect, each of the one or more optical fiber 102 is a multimode fiber. In an aspect, the one or more optical fiber 102 is at least one of loose fiber, flat ribbon, corrugated ribbon and IBR.

The optical fiber cable 100 includes the one or more loose tube 104. Each of the one or more loose tube 104 encloses the one or more optical fiber 102. In an example, each of the one or more loose tube 104 encloses 12 optical fibers (as shown in FIG. 1). The one or more loose tube 104 may enclose any number of optical fibers. In an aspect, each of the one or more loose tube 104 surrounds the one or more optical fiber 102. The one or more loose tube 104 covers the one or more optical fiber 102. Each of the one or more loose tube 104 is a tube for encapsulating the one or more optical fiber 102. The one or more loose tube 104 provides support and protection to each of the one or more optical fiber 102 against crush, bend and stretch. In addition, the one or more loose tube 104 protects the one or more optical fiber 102 and prevents ingression of water inside. In an aspect, the one or more optical fiber 102 may be placed inside a buffer tube (as shown in FIG. 1) or bundled by a binder.

Further, the one or more loose tube 104 provides mechanical isolation, physical damage protection and identification of each of the one or more optical fiber 102. In an aspect, the one or more loose tube 104 provides a single layer core construction.

A material of the one or more loose tube 104 is a mixture of a first material and a second material. A flexural modulus of the first material is at least 1000 MPa. A flexural modulus of the second material is at most 50 MPa. The second material has a lower flexural modulus as compared to the first material. In general, flexural modulus is the tendency of a material to bend or is described in terms of flexural deformation, the ratio of stress to strain. In an aspect, the first material is a base material in the mixture. The second material is added to the first material to form the mixture. In an aspect, the first material is polypropylene. In another aspect, the first material may be a different material. Polypropylene is a material commonly used for manufacturing loose tubes as a strong material is needed to make tubes to provide crush resistance.

In an aspect, the second material is polybutene. In another aspect, the second material may be a different material. In an aspect, the second material is added to the first material with weight percentage of 2% to 10% during manufacturing (explained below in the detailed description of FIG. 2). Polybutene is used to make tubes little flexible to help during handling or installation. A conventional polypropylene (PP) loose tube has a flexural modulus greater than 1000 MPa. After blending 2-10% polybutene or PB-1, the flexural modulus comes down to 600-900 MPa.

The one or more loose tube 104 has a bend diameter. The bend diameter of the one or more loose tube 104 is reduced by at least 10% compared to a conventional loose tube. The material of the conventional loose tube is the first material without the second material or without the blending of the second material. The one or more loose tube 104 has a kink diameter. The kink diameter of the one or more loose tube 104 is reduced by at least 10% compared to the conventional loose tube. The material of the conventional loose tube is the first material without the second material or without the blending of the second material.

In an aspect, the one or more loose tube 104 breaks at elongation of at least 700%. In an aspect, the one or more loose tube 104 is at least one of a central tube and a plurality of loose tubes containing optical fibers (as shown in FIG. 1). In an aspect, melting point of the second material is within 25% tolerance of a melting point of a material of the one or more loose tube 104 of the optical fiber cable 100. In an aspect, melting point of the first material is around 160 degrees Celsius. In another aspect, the melting point of the first material may vary. In an aspect, the melting point of the second material is around 135 degrees Celsius. In another aspect, the melting point of the second material may vary.

In an aspect, each of the one or more loose tube 104 may or may not be filled with a gel. In an aspect, the gel is a thixotropic gel. Also, the thixotropic gel is a viscous fluid or gel under static conditions and flow when shaken or agitated. In an aspect, the thixotropic gel is used for filling in empty spaces inside each of the one or more loose tube 104. In an aspect, the thixotropic gel prevents ingression of water inside each of the one or more loose tube 104.

The optical fiber cable 100 may or may not include the first layer 106. The first layer 106 surrounds the one or more loose tube 104. The first layer 106 may include the one or more yarn. In addition, the first layer 106 binds the one or more loose tube 104. In an aspect, the first layer 106 acts as a binding element for the one or more loose tube 104. In an aspect, each of the one or more yarns is a binder yarn. The binder yarn is made of a material selected from a group. The group consists of polyester, aramid and polypropylene. In an aspect, each of the one or more yarns is a yarn thread. In another aspect, the first layer 106 may be any other type of layer depending on the application.

In an aspect, the binder yarn facilitates absorption of water and moisture. In addition, each of the one or more yarns prevents ingression of the water inside the optical fiber cable 100. In an aspect, the optical fiber cable 100 may have any number of yarn threads. In addition, the first layer 106 binds the stranded one or more loose tube 104 to prevent opening up of the S-Z stranded one or more loose tube 104. In an aspect, the first layer 106 provides retention of the lay length of the one or more loose tube 104.

The optical fiber cable 100 includes the outer sheath 108. The outer sheath 108 surrounds the first layer 106. In an aspect, the outer sheath 108 is a high density polyethylene (HDPE) jacket. The outer sheath 108 is characterized by a thickness of at least 0.5 mm.

In an aspect, the thickness of the outer sheath 108 may vary. In an aspect, the outer sheath 108 is black in color. In another aspect, the outer sheath 108 may be of any color. The outer sheath 108 layer interacts directly with ambient environment. In addition, the outer sheath 108 is a sheathing layer. The outer sheath 108 protects the optical fiber cable 100 against crush, bend and tensile stress along the length of the optical fiber cable 100.

A material of the outer sheath 108 is a mixture of a first material and a second material. A flexural modulus of the first material is at least 500 MPa. A flexural modulus of the second material is at most 50 MPa. In an aspect, the first material is a base material in the mixture. The second material is added to the first material to form the mixture. In an aspect, the first material is polyethylene. In another aspect, the first material may be a different material. Polyethylene is a material commonly used for manufacturing cable sheath to provide crush resistance and environmental protection to fibers.

In an aspect, the second material is polybutene. In another aspect, the second material may be a different material. In an aspect, the second material is added to the first material with weight percentage of 2% to 10% during manufacturing (explained below in the detailed description of FIG. 3).

The range of 2% to 10% is significant. If the weight percentage is less than 2%, the flexibility improvement will not be sufficient for handling easiness. If the weight percentage is more than 10%, sheath or tube will become too flexible and may not satisfy the crush requirement.

The outer sheath 108 has a bend diameter. The bend diameter of the outer sheath 108 is reduced by at least 10% compared to a conventional outer sheath. The material of the conventional outer sheath is the first material without the second material or without the blending of the second material. The outer sheath 108 has a kink diameter. The kink diameter of the outer sheath 108 is reduced by at least 10% compared to the conventional outer sheath. The material of the conventional outer sheath is the first material without the second material or without the blending of the second material. The overall flexural modulus of the material of the material of the outer sheath 108 reduces by blending a low flexural modulus material.

The blending of low flexural material PB-1 in PP or PE makes the overall composition with reduced flexural modulus and hence, increases the material flexibility. In case, a cable component made with dual layer PP-PB1 or PE-PB1 will have only an outer/inner layer made of a flexible material i.e. PB-1. The overall flexibility of the component will not reduce as compared to a single layered PP/PE material.

In an aspect, melting point of the second material is within 25% tolerance of a melting point of a first material of the one or more loose tube 104 or a first material of the outer sheath 108 of the optical fiber cable 100. In an aspect, melting point of the first material is around 160 degrees Celsius. In another aspect, the melting point of the first material may vary. In an aspect, the melting point of the second material is around 135 degrees Celsius. In another aspect, the melting point of the second material may vary.

The optical fiber cable 100 may or may not include the plurality of water swellable yarns 110. The plurality of water swellable yarns 110 may be positioned between the one or more loose tube 104. The plurality of water swellable yarns 110 prevents ingression of water in the stranded core of the optical fiber cable 100. In an aspect, the number of the plurality of water swellable yarns 110 is 2. In another aspect, the number of the plurality of water swellable yarns 110 may vary.

The optical fiber cable 100 may include at least one of the central strength member 112 and one or more embedded strength member. Moreover, the central strength member 112 is made of a fiber reinforced plastic. The fiber reinforced plastic is a composite material made of a polymer matrix reinforced with glass fibers. Examples of the fiber reinforced plastic include glass fiber, carbon fiber, aramid fiber and the like. In an aspect, the central strength member 112 is made of any suitable material.

The central strength member 112 provides tensile strength and stiffness to the optical fiber cable 100 to facilitate blowing. The tensile strength corresponds to a resistance shown by the optical fiber cable 100 against breaking when tension is applied. Moreover, the central strength member 112 provides physical strength to the optical fiber cable 100 and resists over bending of the optical fiber cable 100. Also, the central strength member 112 prevents buckling of the optical fiber cable 100.

The optical fiber cable 100 may or may not include the one or more embedded strength member. In another aspect, the optical fiber cable 100 includes the one or more embedded strength member. The one or more embedded strength member is embedded in the outer sheath 108 of the optical fiber cable 100. The one or more embedded strength member lies substantially along a longitudinal axis of the optical fiber cable 100. In addition, the one or more embedded strength member provides tensile strength and stiffness to the optical fiber cable 100.

In an aspect, the one or more embedded strength member is made of a material selected from a group. The group consists of fiber reinforced plastic, aramid reinforced plastic, steel wire or any other desired material. Further, the one or more embedded strength member is characterized by a diameter. In an aspect, the one or more embedded strength member has a diameter of about at least 0.5 mm. In another aspect, the diameter of the one or more embedded strength member may vary.

In an aspect, number of the one or more embedded strength member is 2. In another aspect, the number of the one or more embedded strength member may be more than 2.

The optical fiber cable 100 may or may not include the ripcord 114. In an aspect, the optical fiber cable 100 may include more ripcords. In an aspect, the ripcord 114 is placed inside the outer sheath 108. The ripcord 114 lies substantially along the longitudinal axis of the optical fiber cable 100. In an aspect, the ripcord 114 facilitates stripping of the outer sheath 108. In an aspect, the ripcord 114 is made of a polyester material. In another aspect, the ripcord 114 is made of any suitable material. In an aspect, the ripcord 114 has circular cross-section. In an aspect, a number of the ripcord 114 is 1. In another aspect, the number of the ripcord 114 may vary.

In an example, a PP tube of 1.7/2.4 mm (ID/OD) was made with a blend of 4% PB-1. The tube shows a kink diameter of 8D (D=OD). Whereas a conventional PP tube has a kink diameter of 10D equaling to almost 20% reduction in kink diameter with PB-1.

FIG. 2 illustrates a block diagram of a system 200 for manufacturing the one or more loose tube 104 of FIG. 1, in accordance with various aspects of the present disclosure. The system 200 includes a first material unit 202, a second material unit 204, a hopper 206 and a payoff 208. Further, the system 200 includes a tube extruder 210, water through 212 and a takeaway drum 214.

The first material unit 202 contains the first material and the second material unit 204 contains the second material. The first material and the second material are added to the hopper 206. The first material is the base material for manufacturing of the one or more loose tube 104 in the optical fiber cable 100. The first material for the one or more loose tube 104 is the conventional material used for loose tube. The one or more optical fiber 102 is surrounded by the gel and enclosed inside the one or more loose tube 104 (as explained above in the detailed description of FIG. 1). In general, loose tube are the most widely used elements in optical fiber cables for outside plant trunks because it offers protection for the fibers under high pulling tensions and can be easily protected from moisture with water-blocking gel or water swellable yarns.

Further, the one or more loose tube 104 is surrounded by the outer sheath 108 (as explained above in the detailed description of FIG. 1). In general, the one or more optical fiber 102 and one more additional layers are covered with a substantial outer plastic sheath in order to reduce abrasion and to provide the cable with extra protection against external mechanical effects such as crushing.

The first material is polypropylene. In general, polypropylene is a thermoplastic used in a wide variety of applications and produced via chain growth polymerization from monomer propylene. Polypropylene is non polar, white, mechanically rugged and has a high chemical resistance. Polypropylene is the first material to make the one or more loose tube 104. The first material is added to the hopper 206 as a base material. The first material is added to the hopper 206 in one or more forms. The one or more forms include at least one of solid form and liquid form.

The system 200 includes the second material unit 204. The second material unit 204 contains the second material. The second material has a lower flexural modulus as compared to the first material. In general, flexural modulus is the tendency of a material to bend or is described in terms of flexural deformation, the ratio of stress to strain. The second material is added to the first material inside the hopper 206. The second material is added to the first material to improve flexibility of the first material while keeping other structural properties unaffected. The other structural properties include at least one of tensile strength, crush resistance and resistance to environmental conditions. The second material is polybutene. In general, polybutene is an organic polymer made from a mixture of 1-butene, 2-butene and iso butylene. Polybutene is low reactivity compound used as sealants, adhesives, extenders for putties used for sealing roofs and windows, coatings, polymer modification, tackified polyethylene films, personal care and polybutene emulsions. The second material is added to the hopper 206 with a weight ratio between 2% to 10% with respect to the first material. The second material is added to the hopper 206 in one or more forms. The one or more forms include at least one of solid form and liquid form.

In an example, with addition of 4% polybutene in polypropylene, kink diameter of the one or more loose tube 104 is reduced by 20% as compared to the kink diameter of the one or more loose tube 104 made with polypropylene only. In another aspect, the optical fiber cable 100 may be used as IBR cables with flexible loose tubes/sheath and high fiber count for datacentres. In yet another aspect, the optical fiber cable 100 may be used as microcables with flexible loose tubes for connectivity and networking. In yet another aspect, the optical fiber cable 100 may be used as armored cable with flexible loose tubes.

The system 200 includes the hopper 206. In general, hopper is a large container in the shape of pyramid or cone shaped. Hopper is used in industrial processes to hold particulate matter or flow-able material like dust, gravel, nuts, seeds, small metal or plastic assembly components. The first material and the second material is added to the hopper 206 in one or more forms to form a mixture.

The system 200 includes the payoff 208. In general, a payoff is a supply system used to supply material from a spool or coil into a manufacturing process, inspection operation, or simply to a take-up unit for respooling. The payoff 208 provides one or more optical fiber 102 for manufacturing of the optical fiber cables 100.

The system 200 includes the tube extruder 210. In general, extruder is simply a machine used to complete the extrusion process. Using a system of barrels and cylinders, the extruder heats up the product and propel the product through the die to create the desired shape. The tube extruder 210 receives the mixture from the hopper 206. The extruder heats the mixture and converts it into a semi liquid form. The heated mixture passes through the tube extruder 210 and forms the one or more loose tube 104. The tube extruder 210 receives the one or more optical fiber 102 from the payoff 208.

The system 200 includes the water through 212. The one or more loose tube 104 is passed through the water through to lower the temperature of the one or more loose tube 104. The water through 212 lowers the temperature of the one or more loose tube 104 to solidify the one or more loose tube 104.

The system 200 includes the takeaway drum 214. In general, a takeaway drum is a collection system used to collect material in from a spool or coil from a manufacturing process. The takeaway drum 214 collects the one or more loose tube 104 in form of a coil.

FIG. 3 illustrates a block diagram of a system 300 for manufacturing the outer sheath 108 of FIG. 1, in accordance with various aspects of the present disclosure. The system 300 includes a first material unit 302, a second material unit 304, a hopper 306 and a payoff 308. Further, the system 300 includes a sheath extruder 310, water through 312 and a takeaway drum 314.

The first material unit 302 contains the first material and the second material unit 304 contains the second material. The first material and the second material are added to the hopper 306. The first material is the base material for manufacturing of the outer sheath 108 in the optical fiber cable 100. The first material for the outer sheath 108 is the conventional material used for outer sheath.

Further, the first material is the base material for manufacturing of the outer sheath 108 of the optical fiber cable. The one or more loose tube 104 is surrounded by the outer sheath 108 (as explained above in the detailed description of FIG. 1). In general, the one or more optical fiber 102 and one or more additional layers are covered with a substantial outer plastic sheath in order to reduce abrasion and to provide the cable with extra protection against external mechanical effects such as crushing.

The first material is polyethylene. In general, polyethylene is a thermoplastic polymer with a variable crystalline structure and a vast range of applications depending on the particular type. Polyethylene is the first material to make the outer sheath 108. The first material is added to the hopper 306 as a base material. The first material is added to the hopper 306 in one or more forms. The one or more forms include at least one of solid form and liquid form.

The system 300 includes the second material unit 304. The second material unit 304 contains the second material. The second material has a lower flexural modulus as compared to the first material. In general, flexural modulus is the tendency of a material to bend or is described in terms of flexural deformation, the ratio of stress to strain. The second material is added to the first material inside the hopper 306. The second material is added to the first material to improve flexibility of the first material while keeping other structural properties unaffected. The other structural properties include at least one of tensile strength, crush resistance and resistance to environmental conditions. The second material is polybutene. In general, polybutene is an organic polymer made from a mixture of 1-butene, 2-butene and iso butylene. Polybutene is low reactivity compound used as sealants, adhesives, extenders for putties used for sealing roofs and windows, coatings, polymer modification, tackified polyethylene films, personal care and polybutene emulsions. The second material is added to the hopper 306 with a weight ratio between 2% to 10% with respect to the first material. The second material is added to the hopper 306 in one or more forms. The one or more forms include at least one of solid form and liquid form.

In an example, with addition of 4% polybutene in polyethylene, kink diameter of the outer sheath 108 is reduced by 10% as compared to the kink diameter of the outer sheath 108 made with polyethylene only. In an aspect, the optical fiber cable 100 may be used as tubeless IBR cables with flexible sheath and high fiber count for data centres. In another aspect, the optical fiber cable 100 may be used as IBR cables with flexible loose tubes/sheath and high fiber count for data centres. In yet another aspect, the optical fiber cable 100 may be used as micro cables with flexible loose tubes for connectivity and networking. In yet another aspect, the optical fiber cable 100 may be used as armored cable with flexible loose tubes.

The system 300 includes the hopper 306. In general, hopper is a large container in the shape of pyramid or cone shaped. Hopper is used in industrial processes to hold particulate matter or flow-able material like dust, gravel, nuts, seeds, small metal or plastic assembly components. The first material and the second material is added to the hopper 306 in one or more forms to form a mixture.

The system 300 includes the payoff 308. In general, a payoff is a supply system used to supply material from a spool or coil into a manufacturing process, inspection operation, or simply to a take-up unit for respooling. The payoff 308 provides one or more optical fiber 102 for manufacturing of the outer sheath 108.

The system 300 includes the sheath extruder 310. In general, extruder is simply a machine used to complete the extrusion process. Using a system of barrels and cylinders, the extruder heats up the product and propels the product through the die to create the desired shape. The sheath extruder 310 receives the mixture from the hopper 306. The extruder heats the mixture and converts it into a semi liquid form. The heated mixture passes through the sheath extruder 310 and forms the outer sheath 108. The sheath extruder 310 receives the one or more optical fiber 102 from the payoff 308.

The system 300 includes the water through 312. The outer sheath 108 is passed through the water through to lower the temperature of the outer sheath 108. The water through 312 lowers the temperature of the outer sheath 108 to solidify the outer sheath 108.

The system 300 includes the takeaway drum 314. In general, a takeaway drum is a collection system used to collect material in from a spool or coil from a manufacturing process. The takeaway drum 314 collects the outer sheath 108 in form of a coil.

The foregoing descriptions of specific aspects of the present technology have been presented for purposes of illustration and description. They are not intended to be exhaustive or to limit the present technology to the precise forms disclosed, and obviously many modifications and variations are possible in light of the above teaching. The aspects were chosen and described in order to best explain the principles of the present technology and its practical application, to thereby enable others skilled in the art to best utilize the present technology and various aspects with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible aspects of the invention have been described above and illustrated in some cases, it should be interpreted and understood as to have been presented only by way of illustration and example, but not by limitation. Thus, the breadth and scope of a preferred aspect should not be limited by any of the above-described exemplary aspects.

We claim:

1. An optical fiber cable (100) comprising:
   one or more optical fiber (102);
   one or more loose tube (104) surrounding the one or more optical fiber (102), wherein a material of the one or more loose tube (104) is a mixture of a first material and a second material, wherein flexural modulus of the first material is at least 1000 MPa, wherein flexural modulus of the second material is at most 50 MPa, wherein the second material is added to the first material with a weight percentage of 2% to 10% to reduce a bend diameter and a kink diameter by at least 10% compared to a conventional loose tube; and
   an outer sheath (108) surrounding the one or more loose tube (104).

2. The optical fiber cable (100) as claimed in claim 1, wherein the first material is a base material in the mixture, wherein the second material is added to the first material to form the mixture, wherein the first material is polypropylene.

3. The optical fiber cable (100) as claimed in claim 1, wherein the second material is polybutene.

4. The optical fiber cable (100) as claimed in claim 1, wherein the one or more optical fiber (102) is at least one of loose fiber, flat ribbon, corrugated ribbon and IBR.

5. The optical fiber cable (100) as claimed in claim 1, wherein the one or more loose tube (104) breaks at elongation of at least 700%.

6. The optical fiber cable (100) as claimed in claim 1, wherein the one or more loose tube (104) is at least one of a central tube and a plurality of loose tubes containing optical fibers.

7. The optical fiber cable (100) as claimed in claim 1, wherein melting point of the second material is within 25% tolerance of a melting point of the one or more loose tube (104) and the outer sheath (108) of the optical fiber cable (100).

8. The optical fiber cable (100) as claimed in claim 1, wherein the first material has a melting point of around 160 degrees Celsius, wherein the second material has a melting point of around 135 degrees Celsius.

9. An optical fiber cable (100) comprising:
   one or more optical fiber (102) extending longitudinally along a length of the optical fiber cable (100); and
   an outer sheath (108) surrounding the one or more optical fiber (102), wherein material of the outer sheath (108) is a mixture of a first material and a second material, wherein flexural modulus of the first material is at least 500 MPa, wherein flexural modulus of the second material is at most 50 MPa, wherein the second material is added to the first material with a weight percentage of 2% to 10% to reduce a bend diameter and a kink diameter by at least 10% compared to a conventional outer sheath.

10. The optical fiber cable (100) as claimed in claim 9, wherein the first material is a base material in the mixture, wherein the second material is added to the first material to form the mixture, wherein the first material is polyethylene.

11. The optical fiber cable (100) as claimed in claim 9, wherein the second material is polybutene.

12. The optical fiber cable (100) as claimed in claim 9, wherein the outer sheath (108) is embedded with one or more embedded strength member (116).

13. The optical fiber cable (100) as claimed in claim 9, wherein the one or more optical fiber (102) is at least one of loose fiber, flat ribbon, corrugated ribbon and IBR.

14. The optical fiber cable (100) as claimed in claim 9, wherein the one or more optical fiber (102) is placed inside one of buffer tube or bundled by a binder.

15. The optical fiber cable (100) as claimed in claim 9, wherein melting point of the second material is within 25% tolerance of melting point of material of the outer sheath (108) and material of the one or more loose tube (104).

16. The optical fiber cable (100) as claimed in claim 9, wherein the first material has a melting point of around 160 degrees Celsius, wherein the second material has a melting point of around 135 degrees Celsius.

* * * * *